Patented May 5, 1925.

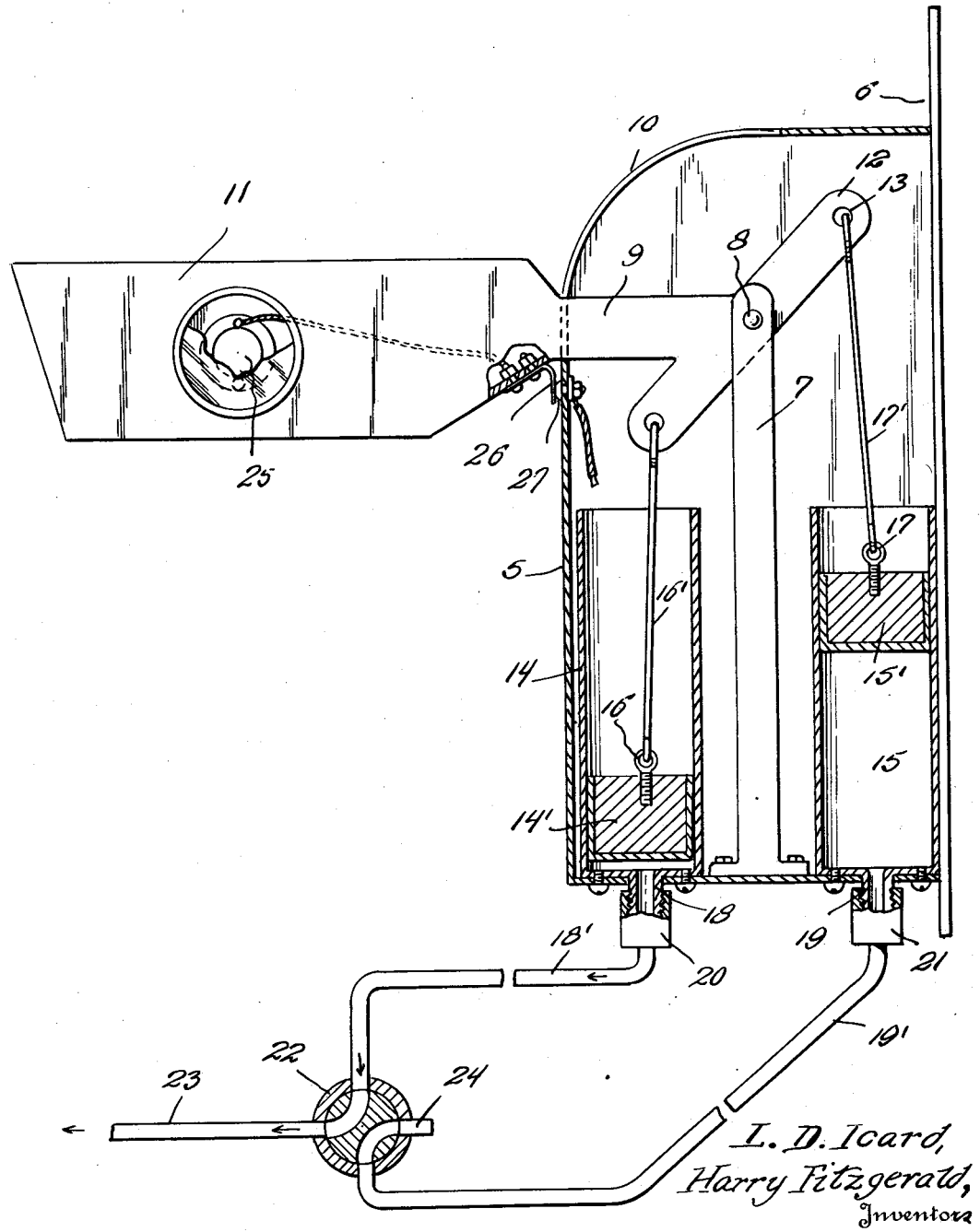

1,536,501

UNITED STATES PATENT OFFICE.

LYDA DELBERT ICARD AND HARRY FITZGERALD, OF BARBOURSVILLE, WEST VIRGINIA.

DIRECTION INDICATOR FOR VEHICLES.

Application filed May 17, 1924. Serial No. 714,038.

*To all whom it may concern:*

Be it known that we, LYDA D. ICARD and HARRY FITZGERALD, citizens of the United States, residing at Barboursville, in the county of Cabell and State of West Virginia, have invented certain new and useful Improvements in Direction Indicators for Vehicles, of which the following is a specification.

This invention relates generally to the art of signals and has more particular reference to an indicator adapted to be attached to the outside of a vehicle, and preferably at a point adjacent the windshield thereof, whereby the intentions of the driver of the vehicle to make a left hand turn, may be readily indicated to those forwardly and rearwardly of the vehicle.

The primary object of the invention is to provide a signal of this character, that constitutes the provision of a movable signal arm that is actuated automatically under the control of the operator, the actuating medium for said signal arm being preferably the suction created in the intake manifold of the engine, during the operation thereof.

A further and important object is to provide an electrical illuminating means for the signal arms, the circuit to said illuminating means being completed, when said arm is moved to a fully indicating position.

An additional object is to provide an indicator of the above character, that is relatively simple of construction, and one that may be manufactured and marketed at a low cost, and one wherein the operation of the same is efficient at all times, the device comprising relatively few parts, and these co-related in such a manner as to reduce the possibility of disarrangement to a minimum.

With the foregoing and other objects in view, as the nature of the invention will be better understood, the same comprises the novel form, combination and arrangements of parts hereinafter more fully described, shown in the accompanying drawing and claimed.

In the drawing:

The figure is a detail vertical sectional view of a direction indicator constructed in accordance with the present invention.

Now having particular reference to the drawings, our novel direction indicator constitutes the provision of a sheet metal casing 5, that is open at its inner side and provided with a closure wall 6 at its inner side, the upper and lower ends of which extend beyond the top and bottom walls of the casing, whereby the same may be adequately secured to the vehicle and preferably at a point adjacent the left hand side of the windshield thereof.

Disposed vertically within the casing 5 and centrally thereof is a relatively elongated standard 7, that is rigidly secured at its lower end to the bottom wall of said casing, pivotally secured as at 8, to the upper end of this standard 7 is the inner end of an arm 9, that extends outwardly through a slot 10 of the casing, said arm being relatively wider outwardly of said slot, for effecting an indicating arm 11.

Formed upon the inner end of said arm 9 is a diagonally extending arm 12, that is formed adjacent its opposite ends with openings 13.

Arranged within the casing 5 and at opposite sides of the standard 7 are open upper ended cylinders 14 and 15 respectively, within which are rectilinearly movable solid pistons 14' and 15'. Pivotally secured at their lower ends to the top sides of said pistons as at 16 and 17 are relatively elongated rods 16' and 17', the upper ends of which are looped or eyed for engagement through the opening 13 in said diagonal arm 12 of the indicating arm 9.

The bottom wall of the said cylinders 14 and 15 are formed with pendant inlet nipples 18 and 19 that extend through openings in the bottom wall of the casing, and with which are associated air pipes 18' and 19' through the medium of suitable couplings 20 and 21.

From an examination of the drawing, it will at once be apparent that the connections between the pistons 14' and 15', and said diagonally extending arm 12 of the indicating member, when one piston is at a downward position within its cylinder, that the other piston will be at an upward position within its cylinder, and vice versa.

The outer ends of said pipes 18' and 19' are attached to a multi-way valve 22, with which is also associated a suction pipe 23 and a vent pipe 24. We do not place any claim upon this particular form of valve, it only being necessary that the construction of the same be such as at different relative positions of the core thereof, the pipe 23 will have communication with either the pipe 18' or 19', for creating a suction in the respective cylinder 14 or 15, for drawing the piston within that particular cylinder downwardly, for moving the signal arm 11 to an indicating or unindicating position. The nature of this valve is also such as to permit the inlet of air into the particular cylinder, the piston of which is moving in an upward direction simultaneously, with the downward movement of the piston within the other of said cylinders.

The pipe 23 is preferably attached to the intake manifold of the vehicle engine, whereby when the valve is so actuated, an operation of the signal will be resultant.

The signal arm 11 carries an electric lamp 25 that is normally in open circuit with a suitable source of supply (not shown), preferably the storage battery of the vehicle, and suitable contacts 26 and 27 in the circuit are carried by said signal arms and the casing 5 respectively, whereby when the arm 11 is moved downwardly, to the position shown in the figure, these contacts will be engaged for obviously completing the circuit to said lamp for illuminating the arm 11.

It will thus be seen that we have provided a highly novel and efficient form of direction indicator particularly adapted for motor vehicles, and even though we have herein shown and described the most practical embodiments of the invention, with which we are at this time familiar, it is nevertheless to be understood that minor changes may be made in the invention without departing from the spirit and scope of the appended claim.

Having thus described the invention, what is claimed is:

In a direction indicator for vehicles of the character described, a casing adapted to be attached to the vehicle, a pair of spaced vertically arranged cylinders within said casing, pistons movable within said cylinders, an indicating arm pivotally secured at one end to the upper end of a standard also within said casing and adapted to extend outwardly to a slot in said casing, a diagonally extending member formed upon the inner side of the arm, link connections between the opposite ends of said diagonal arms and the cylinder pistons, and valve controlled means whereby said cylinders may be connected to a suction means, whereby, by operation of the valve, a selective piston within its cylinder may be drawn downwardly for moving said signal arms to an indicating or non-indicating position.

In testimony whereof we affix our signatures.

LYDA DELBERT ICARD.
HARRY FITZGERALD.